(12) United States Patent
Andrychowicz et al.

(10) Patent No.: US 9,448,806 B2
(45) Date of Patent: Sep. 20, 2016

(54) CIRCUIT AND METHOD FOR IDENTIFYING EXCEPTION CASES IN A FLOATING-POINT UNIT AND GRAPHICS PROCESSING UNIT EMPLOYING THE SAME

(71) Applicant: Nvidia Corporation, Santa Clara, CA (US)

(72) Inventors: Marcin Andrychowicz, Grojec (PL); Alex Fit-Florea, Belmont, CA (US)

(73) Assignee: Nvidia Corporation, Santa Clara, CA (US)

( * ) Notice: Subject to any disclaimer, the term of this patent is extended or adjusted under 35 U.S.C. 154(b) by 752 days.

(21) Appl. No.: 13/626,104

(22) Filed: Sep. 25, 2012

(65) Prior Publication Data
US 2014/0089644 A1 Mar. 27, 2014

(51) Int. Cl.
G06F 7/38 (2006.01)
G06F 9/00 (2006.01)
G06F 9/44 (2006.01)
G06F 9/38 (2006.01)
G06F 9/30 (2006.01)

(52) U.S. Cl.
CPC ......... *G06F 9/3861* (2013.01); *G06F 9/30014* (2013.01); *G06F 9/30181* (2013.01)

(58) Field of Classification Search
CPC .................. G06F 9/3861; G06F 9/30181
USPC .............................................. 712/222
See application file for complete search history.

(56) References Cited

U.S. PATENT DOCUMENTS 6,996,596 B1 * 2/2006 Ho et al. .............. 708/495

* cited by examiner

*Primary Examiner* — Chun-Kuan Lee

(57) ABSTRACT

A floating-point unit and a method of identifying exception cases in a floating-point unit. In one embodiment, the floating-point unit includes: (1) a floating-point computation circuit having a normal path and an exception path and operable to execute an operation on an operand and (2) a decision circuit associated with the normal path and the exception path and configured to employ a flush-to-zero mode of the floating-point unit to determine which one of the normal path and the exception path is appropriate for carrying out the operation on the operand.

20 Claims, 2 Drawing Sheets

CIRCUIT AND METHOD FOR IDENTIFYING EXCEPTION CASES IN A FLOATING-POINT UNIT AND GRAPHICS PROCESSING UNIT EMPLOYING THE SAME

TECHNICAL FIELD

This application is directed, in general, to a floating-point unit (FPU) in a processor and, more specifically, to a circuit and method for identifying exception cases in an FPU and a graphics processing unit (GPU) employing the circuit or the method.

BACKGROUND

Most modern processors are capable of performing arithmetic operations on values represented in floating-point notation. Floating-point arithmetic operations, including addition, subtraction, multiplication, division, and square root, are executed by an FPU within the processor. Floating-point arithmetic is often the foundation of graphics processing performed by both central processing units (CPU) and GPUs. IEEE Standard 754, developed by the Institute of Electrical and Electronic Engineers, sets forth the standard for binary floating-point arithmetic operation. IEEE 754 compliance and the efficiency of floating-point computations have received increasing attention as the demand for accelerated graphics processing has increased.

In the context of binary computers, a floating-point number is represented as a sign (a digit or string of digits representing a plus or minus), a mantissa or significant (a string of digits representing a number that is multiplied by a base of two raised by an exponent), and an exponent (a string of digits representing a number that is to raise a base of two). IEEE defines several floating-point formats varying in terms of the precision they represent. The total space allocated for representing a floating-point number can be, for example 32 bits, for single precision, or 64 bits, for double precision.

A correct implementation of IEEE 754 functionality requires algorithms designed to handle both normal and exception cases arising in floating-point arithmetic. Accordingly, modern FPUs typically employ distinct normal and exception computation paths, thus making path selection a critical stage in arithmetic execution. To satisfy the IEEE 754 standard, compliant FPUs are designed to recognize exception cases and then execute the exception path to produce the appropriate result, because an exception case processed via the normal path may produce an invalid result, a result that cannot be represented in floating-point notation, or possibly no result at all.

SUMMARY

One aspect provides a FPU. In one embodiment, the FPU includes: (1) a floating-point computation circuit having a normal path and an exception path and operable to execute an operation on an operand and (2) a decision circuit associated with the normal path and the exception path and configured to employ a flush-to-zero mode of the FPU to determine which one of the normal path and the exception path is appropriate for carrying out the operation on the operand.

Another aspect provides a GPU. In one embodiment, the GPU includes: (1) a control unit, (2) a plurality of processing cores coupled to the control unit, each of the plurality of processing cores having a memory and a FPU, the FPU including: (2a) a floating-point computation circuit having a normal path and an exception path and operable to execute an operation on an operand retrieved from the memory and (2b) a decision circuit associated with the normal path and the exception path and configured to employ a flush-to-zero mode of said FPU to determine which one of the normal and the exception path is appropriate for carrying out the operation on the operand.

Another aspect provides a method of identifying exception cases for a floating-point operation. In one embodiment, the method includes: (1) receiving an operand for processing according to the particular floating-point operation, (2) configuring a FPU in which the floating-point operation is to be executed to employ a flush-to-zero mode, and (3) initiating the floating-point operation, the flush-to-zero mode employing the operand in performing the identification.

BRIEF DESCRIPTION

Reference is now made to the following descriptions taken in conjunction with the accompanying drawings, in which.

DETAILED DESCRIPTION

Figure 1:
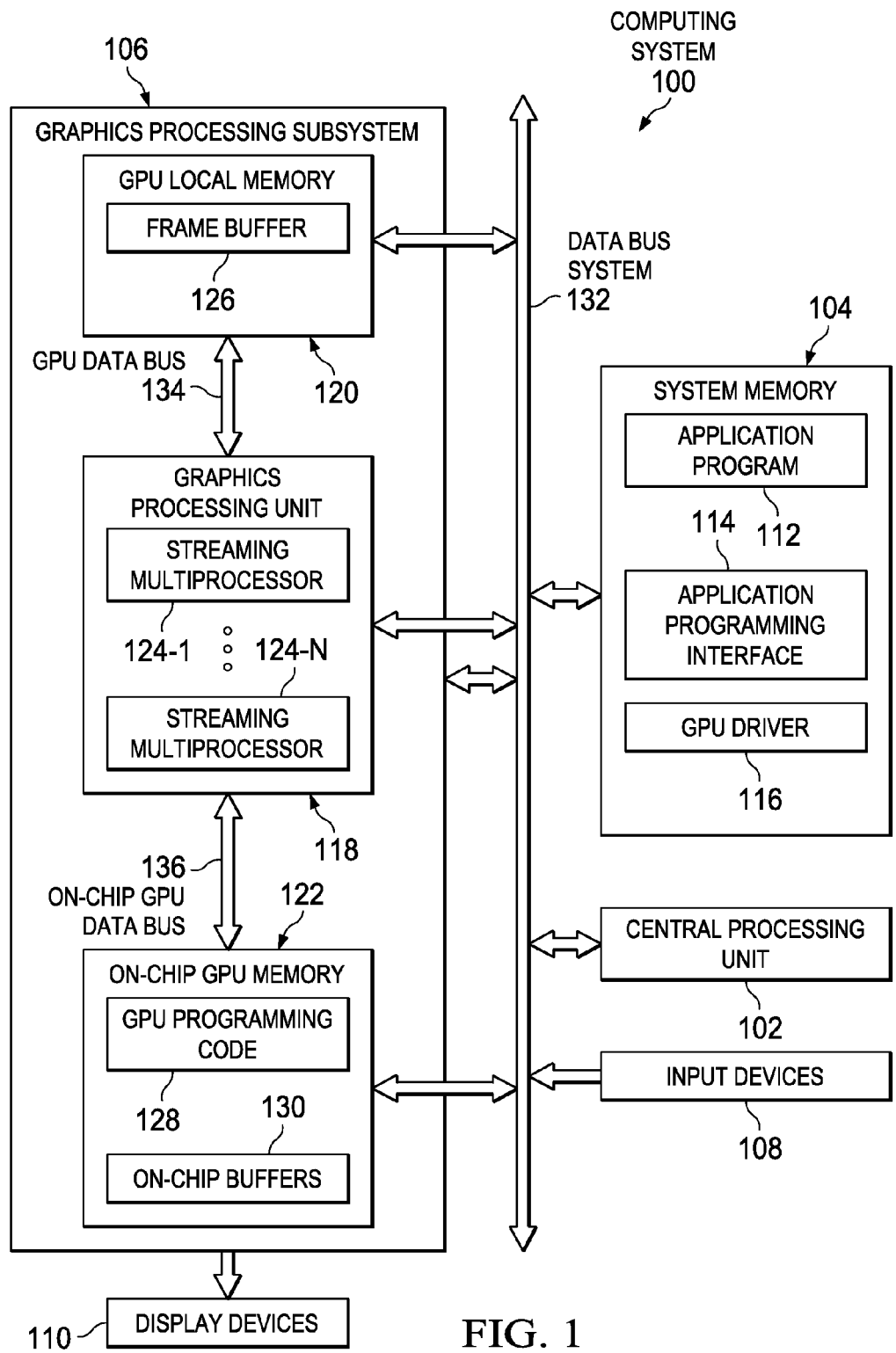
FIG. 1 is a block diagram of one embodiment of a computing system in which one or more aspects of the invention may be implemented.

Floating-point arithmetic operations may be executed faster by increasing processor clock speed. However, it is not a simple matter to increase clock speed, and cost, complexity and yield issues abound such that designers find themselves realizing diminishing returns. Consequently, designers have focused their attention on specialized hardware to execute the operations in fewer clock cycles. However, it is realized herein that some possibilities exist to increase execution speed by changing the way in which the floating-point arithmetic algorithms are executed.

From a conventional perspective, IEEE 754 floating-point algorithms are widely implemented, finely tuned, and leave little room for optimization. However, it is realized herein that conventional tests for identifying exception cases require extra bit manipulation to extract and compare exponents and are costly with respect to processing resources. Consequently, it is realized herein that were the identification and path selection process made more efficient, overall execution speed can increase. It is realized herein that, contrary to conventional practice, a flush-to-zero mode of a FPU may be employed in an IEEE 754 compliant floating-point arithmetic algorithm.

A normal floating-point value has no leading zeros in its mantissa. Leading zeros are instead represented in the exponent. For example, the value 0.01234 is represented as $1.234 \times 10^{-2}$. The limited range of the exponent creates a gap around zero where very small values cannot be represented to full floating-point precision. This gap is known as the underflow gap. Floating-point values with a magnitude in the underflow gap are considered denormal, or more specifically sub-normal, and require leading zeros (i.e., precision loss) in the mantissa to represent a value closer to zero than the smallest normal number. To maintain IEEE 754 compliance, floating-point algorithms are designed to handle denormal numbers by trapping them in software or by the addition of specialized hardware. For this reason, computations involving denormal numbers are generally low performance, computationally expensive, or both.

However, as stated above, compliant FPUs provide a flush-to-zero mode that, when enabled, replaces denormal numbers with zeros. Absent additional action, this mode renders the floating-point operation non-compliant with respect to IEEE 754. For this reason, use of the flush-to-zero mode is widely discouraged. Realized herein is a use of the flush-to-zero mode that strays from the traditional purpose of prohibiting denormal numbers and does not frustrate IEEE 754 compliance.

It is realized herein that employing the flush-to-zero mode in certain floating-point operations within a floating-point arithmetic algorithm supplants the traditional costly tests for exception cases by yielding readily identifiable results, in exception cases, that serve as markers that propagate down the computation stream where they can be captured in an efficient manner. Once the markers are captured, the algorithm selects the exception computation path, thus completing IEEE 754 compliance. Otherwise, in normal cases, the floating-point computation assumes the normal computation path.

Before describing various embodiments of the novel circuit and method for identifying exception cases in a FPU, a computing system within which the circuit may be embodied or the method carried out will be described.

FIG. 1 is a block diagram of one embodiment of a computing system 100 in which one or more aspects of the invention may be implemented. The computing system 100 includes a system data bus 132, a central CPU 102, input devices 108, a system memory 104, a graphics processing subsystem 106, and display devices 110. In alternate embodiments, the CPU 102, portions of the graphics processing subsystem 106, the system data bus 132, or any combination thereof, may be integrated into a single processing unit. Further, the functionality of the graphics processing subsystem 106 may be included in a chipset or in some other type of special purpose processing unit or co-processor.

As shown, the system data bus 132 connects the CPU 102, the input devices 108, the system memory 104, and the graphics processing subsystem 106. In alternate embodiments, the system memory 100 may connect directly to the CPU 102. The CPU 102 receives user input from the input devices 108, executes programming instructions stored in the system memory 104, operates on data stored in the system memory 104, and configures the graphics processing subsystem 106 to perform specific tasks in the graphics pipeline. The system memory 104 typically includes dynamic random access memory (DRAM) used to store programming instructions and data for processing by the CPU 102 and the graphics processing subsystem 106. The graphics processing subsystem 106 receives instructions transmitted by the CPU 102 and processes the instructions in order to render and display graphics images on the display devices 110.

As also shown, the system memory 104 includes an application program 112, an application programming interface (API) 114, and a graphics processing unit (GPU) driver 116. The application program 112 generates calls to the API 114 in order to produce a desired set of results, typically in the form of a sequence of graphics images.

The graphics processing subsystem 106 includes a GPU 118, an on-chip GPU memory 122, an on-chip GPU data bus 136, a GPU local memory 120, and a GPU data bus 134. The GPU 118 is configured to communicate with the on-chip GPU memory 122 via the on-chip GPU data bus 136 and with the GPU local memory 120 via the GPU data bus 134. The GPU 118 may receive instructions transmitted by the CPU 102, process the instructions in order to render graphics data and images, and store these images in the GPU local memory 120. Subsequently, the GPU 118 may display certain graphics images stored in the GPU local memory 120 on the display devices 110.

The GPU 118 includes one or more streaming multiprocessors 124. Each of the streaming multiprocessors 124 is capable of executing a relatively large number of threads concurrently. Advantageously, each of the streaming multiprocessors 124 can be programmed to execute processing tasks relating to a wide variety of applications, including but not limited to linear and nonlinear data transforms, filtering of video and/or audio data, modeling operations (e.g., applying of physics to determine position, velocity, and other attributes of objects), and so on. Of the processing tasks, floating-point processing is allocated to a FPU and integer processing is allocated to an arithmetic logic unit (ALU). The GPU 118 may be provided with any amount of on-chip GPU memory 122 and GPU local memory 120, including none, and may use on-chip GPU memory 122, GPU local memory 120, and system memory 104 in any combination for memory operations.

The on-chip GPU memory 122 is configured to include GPU programming code 128 and on-chip buffers 130. The GPU programming 128 may be transmitted from the GPU driver 116 to the on-chip GPU memory 122 via the system data bus 132.

The GPU local memory 120 typically includes less expensive off-chip dynamic random access memory (DRAM) and is also used to store data and programming used by the GPU 118. As shown, the GPU local memory 120 includes a frame buffer 126. The frame buffer 126 stores data for at least one two-dimensional surface that may be used to drive the display devices 110. Furthermore, the frame buffer 126 may include more than one two-dimensional surface so that the GPU 118 can render to one two-dimensional surface while a second two-dimensional surface is used to drive the display devices 110.

The display devices 110 are one or more output devices capable of emitting a visual image corresponding to an input data signal. For example, a display device may be built using a cathode ray tube (CRT) monitor, a liquid crystal display, or any other suitable display system. The input data signals to the display devices 110 are typically generated by scanning out the contents of one or more frames of image data that is stored in the frame buffer 126.

Having described a computing system within which the circuit and method for identifying exception cases in a FPU may be embodied or carried out, various embodiments of the circuit and method will be described.

Figure 2:
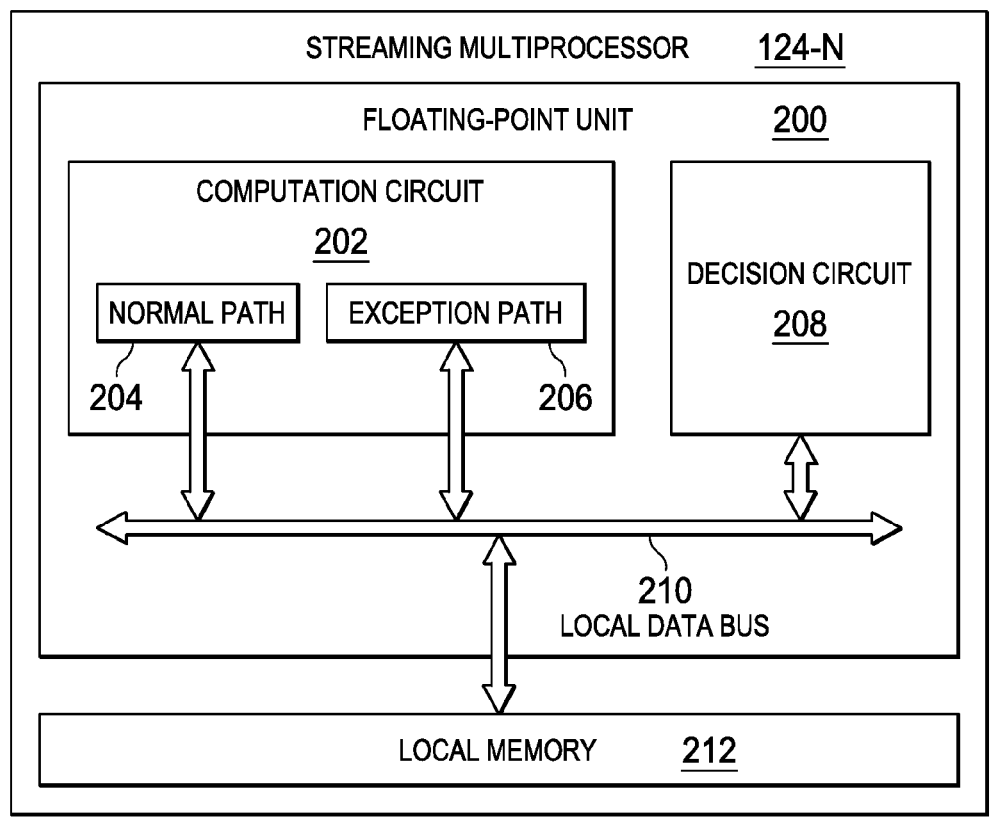
FIG. 2 is a block diagram of one embodiment of a FPU residing within the GPU of FIG. 1.

FIG. 2 is a block diagram of one embodiment of a FPU 200 residing within one of the streaming multiprocessors 124 of FIG. 1. The FPU 200 contains a computation circuit 202 and a decision circuit 208. Certain embodiments of the FPU 200 contain several dedicated computation circuits providing further floating-point arithmetic functionality including addition, subtraction, multiplication, division, and square root. Table 1, below, is a code sample illustrating an embodiment of a floating-point division algorithm. The code employs the flush-to-zero mode in a series of fused-multiply-add operations within an implementation of a Newton-Raphson floating-point division algorithm.

TABLE 1

Sample of an floating-point division algorithm Implementation

```
(1)   ___device___ float div__ieee__rn__noftz(float a, float b){
(2)   unsigned int a__exp = ___float_as__int(a) & 0xff800000u;
      /* adjust the exponent of a */
(3)   float a__man = ___int_as__float((___float_as__int(a) &
0x007fffffu) | 0x3f800000u);
      /* Newton-Raphson. */
      float y; // approx of 1/b
      float q; // quotient
      float r; // remainder
(4)   asm("rcp.ftz.approx.f32 %0,%1;" : "=f"(y) : "f"(b));
      /* FOLLOWING FMA'S MUST BE COMPILED WITH FTZ!!! */
(5)   r = ___fmaf_rn(-b, y, 1.0);
(6)   y = ___fmaf_rn(y, r, y);
(7)   q = ___fmaf_rn(a__man, y, 0.0f);
(8)   r = ___fmaf_rn(-b, q, a__man);
(9)   q = ___fmaf_rn(r, y, q);
(10)  r = ___fmaf_rn(-b, q, a__man);
(11)  q = ___fmaf_rn(r, y, q);
(12)  q = ___fmaf_rn(q, ___int_as__float(a__exp), 0.0f); /* readjust
the exponent of a */
      /* check for under/over-flow */
(13)  unsigned int q__abs = ___float_as__int(q) & 0x7fffffffu;
(14)  if(q__abs > 0x0080000fu && q__abs < 0x7f800000u);
(15)      return q;
(16)  else
(17)      return div__ieee__rn__noftz__slowpath(a, b);
      }
```

In the embodiment of FIG. 2, the computation circuit 202 is divided into a normal path 204 and an exception path 206. The normal path 204, the exception path 206, and the decision circuit 208 are coupled by a local data bus 210. The local data bus 210 also couples the FPU 200 to a local memory 212. In other embodiments, the decision circuit 208 may be embedded in the computation circuit 202 data paths, and need not be separated by the local data bus 210 or any other data bus.

The local memory 212 is operable to retrieve, over the local data bus 210, an operand from an addressed memory location and to store an intermediate result and ultimately a final result from the computation circuit 202, also over the local data bus 210. In certain embodiments, multiple operands are stored and are retrievable from the local memory 212.

The FPU 200 is configured to perform floating-point operations in flush-to-zero mode. The computation circuit 202 is configured to perform a floating-point arithmetic computation by routing an arithmetic computation stream through the normal path 204 or the exception path 206. The decision circuit 208 is configured to select either the normal path 204 or the exception path 206.

The decision circuit 208 is operable to retrieve the operand from local memory 212 over the local data bus 210. The decision circuit 208 identifies an exception case by recognizing a marker in the operand. In certain embodiments, the marker may be any one or more of zero, infinity, and not-a-number (NaN). Also in other embodiments, where the normal path 204 is initiated before the decision circuit 208 determines whether the normal path 204 or the exception path 206 is appropriate, the decision circuit 208 is further operable to retrieve the intermediate results of floating-point operations performed in the computation circuit 202, and is operable to recognize the marker in the intermediate result. An occurrence of the marker in the operand, or alternatively in the intermediate result, indicates an occurrence of the exception case. For example, the code sample in Table 1, above, shows the normal path 204 is nearly entirely executed before a determination, in lines 14 through 17, is made as to whether the exception case has been encountered.

In the embodiment illustrated in FIG. 2, the decision circuit 208 is operable to select the exception path 206 of the computation circuit 202 at the occurrence of the exception case. Otherwise, the normal path 204 is employed for the computation, which, in certain embodiments, is operable at a faster speed than the exception path 206.

FIG. 2 depicts an embodiment with the FPU residing in the GPU. Other embodiments include the FPU residing in a CPU, independent of any graphics processing subsystem or GPU that may be associated with the CPU.

Figure 3:
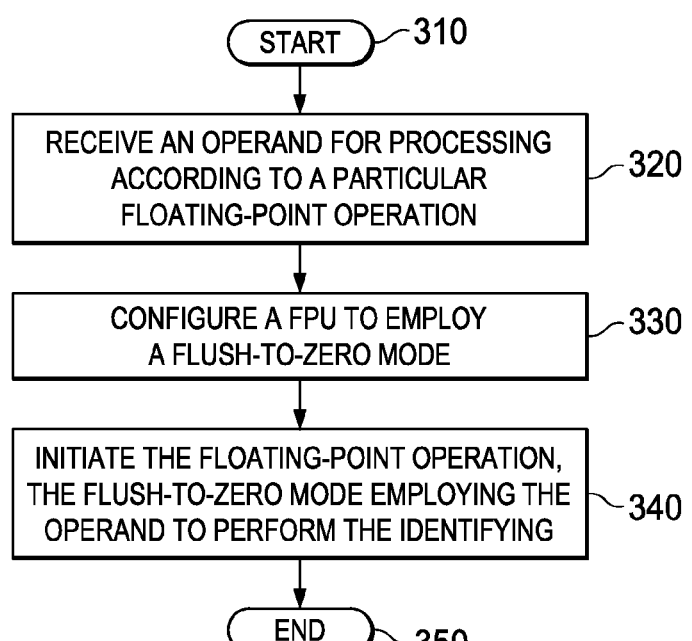
FIG. 3 is a flow diagram of one embodiment of a method of identifying exception cases for a floating-point operation.

FIG. 3 is a flow diagram of one embodiment of a method of identifying exception cases for a floating-point operation. The method begins in step 310. In a step 320, an operand is received for processing according to a particular floating-point operation. In certain embodiments, the floating-point operation may be a division operation, a square-root operation, or a fused-multiply-add operation. In a step 330, an FPU is configured to employ a flush-to-zero mode. The flush-to-zero mode is subsequently employed at a step 340, wherein the floating-point operation is initiated, employing the operand to perform the identifying, which, in certain embodiments is characterized by a resultant being zero, a resultant being infinity, or a resultant being a NaN. In certain embodiments, in an occurrence of an exception case, the FPU processes the exception case in an exception path of the FPU. Also, in certain embodiments, exception cases may be a denormal dividend, a denormal divisor, a denormal quotient, an infinite dividend, an infinite divisor, an infinite quotient, a NaN dividend, a NaN divisor, an overlflow, or an underflow. In the embodiment illustrated in FIG. 3, the method ends at an end step 350.

Those skilled in the art to which this application relates will appreciate that other and further additions, deletions, substitutions and modifications may be made to the described embodiments.

What is claimed is:

1. A floating-point unit, comprising:
   a floating-point computation circuit having a normal path and an exception path and operable to execute an operation on an operand; and
   a decision circuit associated with said normal path and said exception path and configured to employ a flush-to-zero mode of said floating-point unit to determine which one of said normal path and said exception path is appropriate for carrying out said operation on said operand based on an occurrence of a marker generated by said flush-to-zero mode and associated with said operand.

2. The floating-point unit as recited in claim 1 wherein said normal path is faster than said exception path.

3. The floating-point unit as recited in claim 1 wherein execution of said normal path is initiated before said decision circuit determines whether said exception path is appropriate.

4. The floating-point unit as recited in claim 3 wherein said normal path is configured to generate an intermediate result and said decision circuit is configured to employ said flush-to-zero mode with respect to said intermediate result.

5. The floating-point unit as recited in claim 1 wherein said floating-point computation circuit is a division circuit.

6. The floating-point unit as recited in claim 1 wherein said floating-point computation circuit is a square-root circuit.

7. The floating-point unit as recited in claim 1 wherein said decision circuit is configured to employ a flush-to-zero mode of said processing unit with respect to said operand and an additional operand.

8. A method of identifying exception cases for a floating-point operation, comprising:
   receiving an operand for processing according to a floating-point operation;
   performing said floating-point operation in a flush-to-zero mode; and
   identifying an exception case for said operand based on a resultant yielded by said performing.

9. The method as recited in claim 8 wherein said floating-point operation is a division operation.

10. The method as recited in claim 8 wherein said floating-point operation is a square-root operation.

11. The method as recited in claim 8 wherein said floating-point operation is a fused-multiply-add operation.

12. The method as recited in claim 8 wherein said floating-point operation produces an intermediate result, said method further identifying an exception case for said intermediate result based on a resultant associated with said intermediate result.

13. The method as recited in claim 8 further comprising processing said exception case in an exception path of said floating-point unit.

14. The method as recited in claim 8 wherein said resultant is selected from the group of resultants consisting of:
   resultants being zero,
   resultants being infinity, and
   resultants being Not-a-Number.

15. The method as recited in claim 8 wherein said exception cases are selected from the group consisting of:
   a denormal dividend,
   a denormal divisor,
   a denormal quotient,
   an infinite dividend,
   an infinite divisor,
   an infinite quotient,
   a Not-a-Number dividend,
   a Not-a-Number divisor,
   an overflow, and
   an underflow.

16. A graphics processing unit, comprising:
   a control unit; and
   a plurality of processing cores coupled to said control unit, each of said plurality of processing cores having a memory and a floating-point unit, said floating-point unit including: a floating-point computation circuit having a normal path and an exception path and operable to execute an operation on an operand retrieved from said memory, and
   a decision circuit associated with said normal path and said exception path and configured to employ a flush-to-zero mode of said floating-point unit to determine which one of said normal path and said exception path is appropriate for carrying out said operation on said operand based on an occurrence of a marker generated by said flush-to-zero mode and associated with said operand.

17. The graphics processing unit as recited in claim 16 wherein said normal path is faster than said exception path.

18. The graphics processing unit as recited in claim 16 wherein execution of said normal path is initiated before said decision circuit determines whether said exception path is appropriate.

19. The graphics processing unit as recited in claim 18 wherein said normal path is configured to generate an intermediate result and said decision circuit is configured to employ said flush-to-zero mode with respect to said intermediate result.

20. The graphics processing unit as recited in claim 16 wherein said floating-point computation circuit is selected from the group consisting of:
   a division circuit, and
   a square-root circuit.

* * * * *